(12) United States Patent
Bois

(10) Patent No.: US 9,267,861 B2
(45) Date of Patent: Feb. 23, 2016

(54) METHOD AND DEVICE FOR CONTROLLING THE DYNAMIC CONFINEMENT OF AN ENCLOSURE

(71) Applicant: COMMISSARIAT A L'ENERGIE ATOMIQUE ET AUX ENERGIES ALTERNATIVES, Paris (FR)

(72) Inventor: Dominique Bois, Manosque (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 14/380,742

(22) PCT Filed: Feb. 28, 2013

(86) PCT No.: PCT/EP2013/054064
§ 371 (c)(1),
(2) Date: Aug. 25, 2014

(87) PCT Pub. No.: WO2013/127935
PCT Pub. Date: Sep. 6, 2013

(65) Prior Publication Data
US 2015/0013473 A1    Jan. 15, 2015

(30) Foreign Application Priority Data

Feb. 29, 2012  (FR) ...................................... 12 51872
Jan. 8, 2013   (FR) ...................................... 13 50149

(51) Int. Cl.
| | | |
|---|---|---|
| G01F 1/34 | (2006.01) |
| G01M 3/00 | (2006.01) |
| G21F 7/00 | (2006.01) |
| G21F 7/015 | (2006.01) |
| G01F 1/00 | (2006.01) |
| G21C 17/00 | (2006.01) |
| G21D 1/00 | (2006.01) |

(52) U.S. Cl.
CPC . *G01M 3/00* (2013.01); *G01F 1/00* (2013.01); *G21C 17/002* (2013.01); *G21F 7/00* (2013.01); *G21F 7/015* (2013.01); *G21D 1/003* (2013.01)

(58) Field of Classification Search
USPC ....................................................... 73/861.42
See application file for complete search history.

(56) References Cited

FOREIGN PATENT DOCUMENTS

| FR | 2587533 | 3/1987 |
| FR | 2694903 | 2/1994 |
| FR | 2749430 | 12/1997 |
| FR | 2958048 | 9/2011 |

OTHER PUBLICATIONS

International Search Report, International Application No. PCT/EP2013/054064, dated May 27, 2013.

*Primary Examiner* — Jewel V Thompson
(74) *Attorney, Agent, or Firm* — Perman & Green, LLP

(57) ABSTRACT

The invention relates to a method and device for monitoring the confinement of an enclosure including walls delimiting an interior volume and an external environment, according to which a differential pressure (ΔP) is maintained between the interior volume and the external environment. According to the invention, the enclosure includes a port in one of the walls thereof establishing a fluid communication between the interior volume and the external environment, the port is traversed by a gas stream having a speed (V) at least equal to a reference speed Vréf, under the effect of the differential pressure (ΔP). Method according to which the following steps are performed, measuring the speed (V) of the gas stream at predetermined time intervals or continuously, and comparing the speed (V) measurement with reference speed Vréférence, and when the speed (V) measurement is less than reference speed Vréférence, transmitting at least one alarm signal.

15 Claims, 2 Drawing Sheets

METHOD AND DEVICE FOR CONTROLLING THE DYNAMIC CONFINEMENT OF AN ENCLOSURE

CROSS-REFERENCE TO RELATED APPLICATION

This application is the National Stage of International Application No. PCT/EP2013/054064 having International filing date 28 Feb. 2013, which designated the United States of America, and which International Application was published under PCT Article 21 (s) as WO Publication 2013/127935 A1 and which claims priority from, and benefit of, French Application No. 1350149 filed on 8 Jan. 2013 and French Application No. 1251872 filed on 29 Feb. 2012, the disclosures of which are incorporated herein by reference in their entireties.

BACKGROUND

1. Field

The presently disclosed embodiment relates to a method and a device for monitoring the dynamic confinement of a confinement enclosure that is at a raised or at a reduced pressure in relation to the exterior surroundings. The presently disclosed embodiment also relates to an enclosure equipped with such a confinement control device.

2. Brief Description of Related Developments

It is known practice within the nuclear industry to use a confinement enclosure in order to clean up and/or to dismantle radioactive equipment of a nuclear installation, for example if this equipment has become obsolete or if the installation itself is being shut down.

FIG. 1 shows such a confinement enclosure 1 of the prior art. This confinement enclosure 1 comprises a set of vinyl air locks comprising a personnel entrance and exit air lock 2, a materials entrance and exit air lock 3 and an intervention air lock 4. It is inside this latter air lock 4 that one or more operators carry out the operations of cleaning up and/or of dismantling the contaminated equipment.

The first two air locks 2, 3 each have access to the exterior and direct access to the intervention air lock 4. These two air locks 2, 3 do not communicate with one another such that the first air lock 2 is reserved exclusively for personnel, the second air lock 3 being intended only for the removal of the materials resulting for example from the dismantling of the radioactive equipment.

Each air lock 2-4 is typically formed of a metal structure with flexible vinyl walls. Access to the air locks 2-4 is had via two vinyl sheets 5.

These vinyl walls prevent contaminated substances from being dispersed into the environment during cleanup operations.

Such a confinement enclosure 1 intended for dismantling and/or cleanup operations is kept at a reduced pressure in relation to the host space in which this enclosure is situated by means of a ventilation system which may be autonomous or may be connected to the network that exists within the host space.

The materials and personnel entrance/exit air locks 2, 3 are ventilated by air transfer. Only the intervention air lock 4 has forced air extraction (not depicted).

During cleanup and/or dismantling operations, the air flows through the intervention air lock 4 are extracted by a fan preceded by high efficiency particulate air filters (HEPA filters) capable of trapping the particles carried in the air thus extracted.

This creation of a reduced pressure therefore allows contaminated dust generated for example when cutting up radioactive equipment to be confined and sucked up.

The safety of operations relies on the combination of static confinement (airtightness of the walls) of the confinement enclosure and dynamic confinement (ventilation) that allows this enclosure to be kept at a reduced pressure.

The French Nuclear Safety Authority (ASN) recommends that such a confinement enclosure be kept at a reduced pressure by maintaining a pressure differential of the order of −40 Pa to −80 Pa with respect to the host space.

This reduced pressure is currently measured at the start of each working shift, but it is not possible from this to deduce with certainty that this level of reduced pressure is being maintained throughout the cleanup operations and/or the operations of dismantling contaminated material.

Specifically, this reduced pressure may, for example, vary suddenly as a result of a break in the static confinement or alternatively as a result of the filtration system becoming plugged, leading to a drop in the extraction flow rate.

When this happens, the amount of reduced pressure no longer falls within the range of recommended values, causing the cleanup work and/or dismantling work to have to stop until the target reduced pressure can be re-established.

Now, such work stoppages lead to additional costs and significant extensions of deadlines which are incompatible with the economic requirements of the companies involved.

Conversely, there are confinement enclosures which require a raised pressure in order to keep the dust outside such an enclosure. Maintaining a raised pressure makes it possible to maintain a healthy atmosphere inside the enclosure, namely an atmosphere that is devoid of the kind of dust that would hamper the operations performed in this enclosure.

The safety of operations relies on the combination of static confinement (airtightness of the walls) of the confinement enclosure and dynamic confinement (ventilation) that allows this enclosure to be kept at a raised pressure.

The presently disclosed embodiment seeks to alleviate these various disadvantages by proposing a method and a device for monitoring the confinement of an enclosure that is at a reduced pressure or at a raised pressure in relation to the exterior surroundings in which this enclosure is placed, being simple in their design and mode of operation and guaranteeing that these operations can be carried out safely.

Another object of the presently disclosed embodiment is such a method and such a device for monitoring the dynamic confinement of an enclosure that makes it possible to continuously monitor the quality of the dynamic confinement of this enclosure.

In the remainder of this document, the term "confinement" will refer to dynamic confinement or containment. The term "enclosure" will refer to a confinement space.

SUMMARY

To this end, the presently disclosed embodiment relates to a method for monitoring the confinement of an enclosure, said enclosure comprising walls delimiting an interior volume and exterior surroundings outside said enclosure, whereby a differential pressure ($\Delta P$) is continuously maintained between the interior volume of the enclosure and said exterior surroundings.

According to the presently disclosed embodiment,
with the enclosure comprising an orifice in one of its walls establishing fluidic communication between said interior volume and said exterior surroundings, said orifice has passing through it a flow of gas at a speed (V) at least equal to a reference speed $V_{ref}$, under the effect of said differential pressure ($\Delta P$), according to which method the following steps are carried out:

the speed (V) of said gas flow is measured at predetermined time intervals or continuously and this speed measurement (V) is compared with the reference speed $V_{reference}$, when the speed measurement (V) is lower than the reference speed $V_{reference}$, at least one alarm signal is emitted.

This monitoring method therefore comprises a step of monitoring over time the speed of the flow of gas entering the enclosure when the enclosure is at a reduced pressure in relation to the exterior surroundings, or leaving the enclosure when the latter is at a raised pressure in relation to the exterior surroundings, by measuring the speed of this gas flow either continuously or at predetermined time intervals, for example periodically.

Advantageously, this speed measurement is performed at the orifice of predetermined dimensions. The speed of the flow of gas entering or leaving the confinement enclosure through the orifice is directly connected to the extraction or, respectively, inlet flow rate (Q) of the ventilation system that ventilates this enclosure.

By way of example, the flow of gas entering or leaving the confinement enclosure is air or a neutral gas.

The method of monitoring the confinement of an enclosure at a reduced pressure in relation to the exterior surroundings ensures, through measuring a simple parameter throughout the cleanup and/or dismantling operations, that the quality of confinement can be guaranteed and any risk of contamination outside the enclosure can be avoided.

The method of monitoring the confinement of an enclosure at a raised pressure in relation to the exterior surroundings ensures, through measuring a simple parameter throughout the operations performed inside the enclosure, that the quality of confinement can be guaranteed and any risk of contamination outside the enclosure can be avoided.

This speed criterion is simple to:
retain,
obtain,
measure,
monitor over time.

This reference speed:
guarantees correct operation of the containment confinement system,
eliminates the constraints associated with creating a reduced pressure in the enclosure thus reducing the cost of carrying out the work,
or eliminates the constraints associated with placing the enclosure at a raised pressure.

In various aspects of the disclosed embodiment of this confinement monitoring method, each having its own particular advantages and capable of being combined in many possible technical combinations:

said differential pressure ($\Delta P$) between the interior volume of the enclosure and said exterior surroundings is established by at least one ventilation system of said enclosure.

Having determined a reference flow rate ($Q_{ref}$) at which said enclosure is ventilated by said at least one ventilation system, the following steps are carried out:

the flow rate (Q) at which said enclosure is ventilated is measured, the ventilation flow rate measurement (Q) thus obtained is compared with the reference flow rate ($Q_{ref}$) to determine whether the ventilation flow rate has dropped, and if appropriate, the ventilation flow rate (Q) is adjusted to generate a gas flow passing through said orifice at a speed at least equal to said reference speed $V_{reference}$.

The "ventilation flow rate" means the rate at which a flow of gas such as air is extracted or admitted depending on whether said at least one ventilation system operates in an extraction mode or in an admission mode.

The ventilation flow rate (Q) of said enclosure is advantageously measured periodically. Purely by way of illustration, the ventilation flow rate is measured at a frequency of one measurement per day, and better still, one measurement per hour.

By way of example, the ventilation flow rate may have dropped as a result of one or more enclosure filtration stages becoming plugged.

The reference ventilation flow rate ($Q_{ref}$) is advantageously recorded in a storage unit.

Alternatively, with the ventilation flow rate (Q) of said enclosure being equal or substantially equal to the reference flow rate ($Q_{ref}$), the leak or leaks in said enclosure is or are located and said leak or leaks is or are plugged. Purely by way of illustration, this locating of the leak or leaks causing a loss in the static confinement of the enclosure may be performed by sweeping the enclosure with a tracer gas and using one or more analyzers distributed outside the enclosure to detect the presence and concentration of the tracer gas. For preference, the gas with which the enclosure is thus swept is a neutral gas.

Said at least one ventilation system is chosen from the group comprising: a gas flow extraction system, a gas flow inlet system, a reversible system capable of switching between a gas flow extraction mode and a gas flow inlet mode and combinations of these elements.

said differential pressure ($\Delta P$) between the interior volume of the enclosure and said exterior surroundings is established by at least one gas flow supply source that has an inlet flow rate (Q).

Purely by way of illustration, this at least one gas flow supply source comprises at least one pressurized container of a flow of gas. This or these pressurized containers may be connected to a feed circuit supplying the enclosure with a flow of gas.

Of course, as need be, it is possible to introduce one or more different gas flows.

Having determined a reference inlet flow rate ($Q_{ref}$) at which said at least one supply source supplies said enclosure with a flow of gas, the following steps are carried out:

the inlet flow rate (Q) to said enclosure is measured, the inlet flow rate measurement (Q) thus obtained is compared with the reference flow rate ($Q_{ref}$) in order to determine whether the inlet flow rate (Q) has dropped, and where appropriate, the inlet flow rate (Q) is adjusted in order to generate a flow of gas passing through said orifice at a speed at least equal to said reference speed $V_{reference}$.

Advantageously, with the inlet flow rate (Q) of said enclosure being equal or substantially equal to the reference flow rate ($Q_{ref}$), the leak or leaks in said enclosure is or are located and said leak or leaks is or are plugged.

said reference speed $V_{reference}$ is at least equal to $1$ m·s$^{-1}$.

The invention also relates to a device for implementing the confinement monitoring method as described hereinabove.

According to the presently disclosed embodiment, this device comprises:

a pipe of diameter D intended to be mounted on an orifice of a wall of said enclosure, said pipe comprising a non-return valve which closes off said pipe to prevent the passage of a flow of gas from inside the enclosure toward the exterior surroundings when said enclosure is at a reduced pressure with respect to the exterior surroundings, or from the exterior surroundings toward the interior volume of said enclosure when said enclosure is at a raised pressure with respect to the exterior surroundings, and a means of measuring the speed of the gas flow passing along said pipe.

For example, this means of measuring speed is a hot-wire anemometer or a vane anemometer.

With the anemometer being a hot-wire anemometer, this anemometer is advantageously positioned a distance of at least five (5)×D from the ends of said pipe in order to guarantee the most reliable possible measurement.

For preference, the device additionally comprises an audible and/or luminous alarm for emitting at least one alarm signal when the speed (V) measured by the speed measuring means is below a threshold speed value such as the reference speed $V_{reference}$.

Advantageously, with the speed measuring means being connected to a processing unit that processes the signal emitted by this measurement means, this or these alarms may be connected to the processing unit and controlled thereby. Alternatively, the processing unit itself emits the alarm.

The presently disclosed embodiment also relates to an enclosure comprising at least one interior volume delimited by walls and at least one device for placing this interior volume of said enclosure at a reduced pressure or at a raised pressure in relation to the exterior surroundings in which said enclosure is placed.

According to the presently disclosed embodiment, this enclosure comprises a device for implementing the confinement monitoring method as described hereinabove, this device being mounted on an orifice of one of said walls of the enclosure delimiting said interior volume.

BRIEF DESCRIPTION OF THE DRAWINGS

Further advantages, objects and specific features of the presently disclosed embodiment will become apparent from the following description given, by way of nonlimiting explanation, with reference to the attached drawings in which.

DETAILED DESCRIPTION

First of all, it should be noted that the figures are not to scale.

Figure 1:
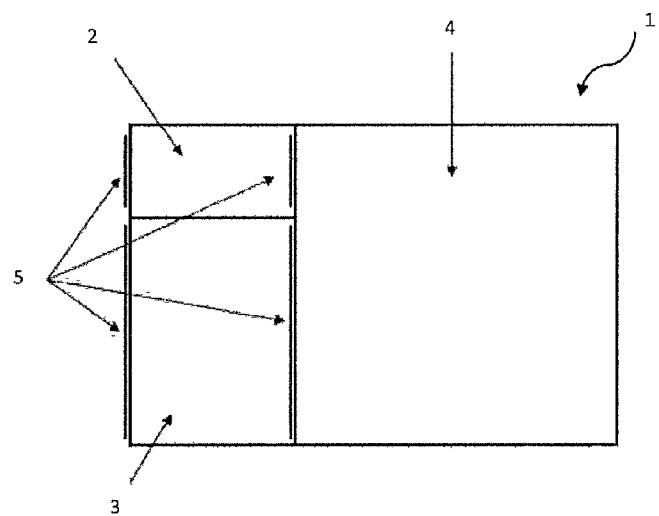
FIG. 1 schematically depicts a confinement enclosure at a reduced pressure in relation to the exterior surroundings, from the prior art.
Figure 2:
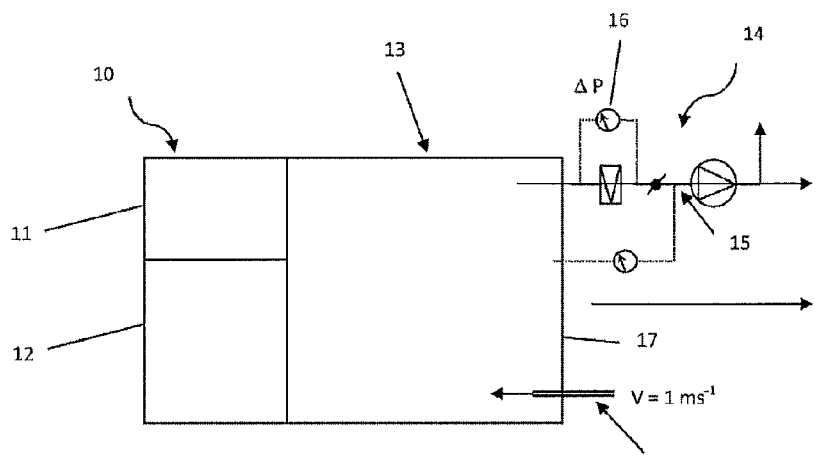
FIG. 2 shows an enclosure at a reduced pressure according to one aspect of the presently disclosed embodiment of the present invention, this enclosure comprising a device for controlling the airtightness of the enclosure, FIG. 3 schematically depicts the airtightness control device of the enclosure of FIG. 2.
Figure 3:
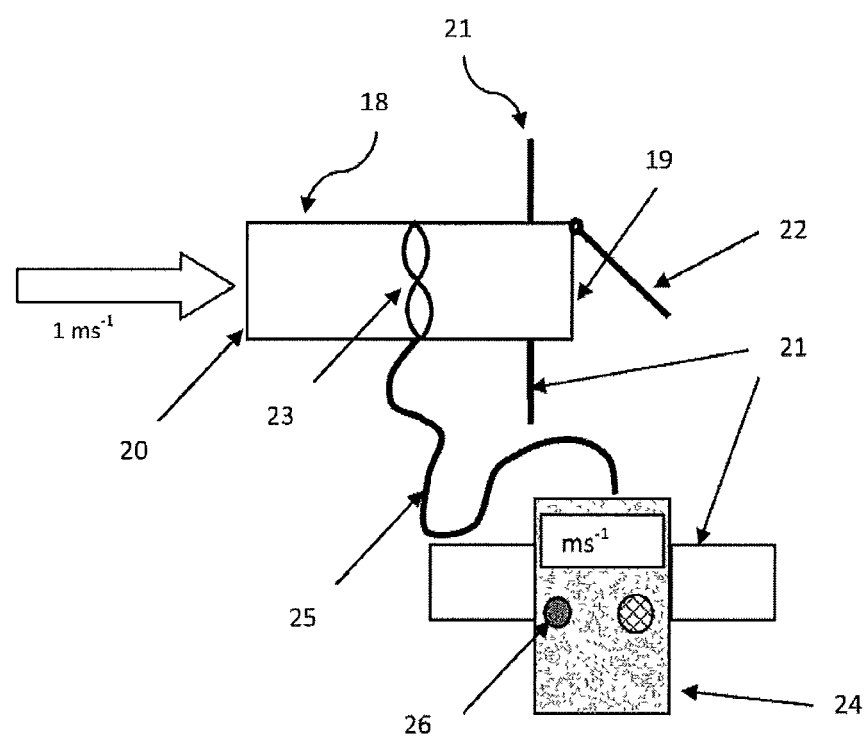

FIG. 2 shows an enclosure 10 which is at a reduced pressure in relation to the exterior surroundings according to one aspect of the presently disclosed embodiment.

This enclosure 10 comprises a metallic structure covered with sheets of vinyl delimiting a first airlock 11 for the circulation of one or more operator(s) and a second air lock 12 intended to accommodate and allow the removal of structural materials resulting from the cleaning up and/or the dismantling of contaminated elements, equipment or installations.

The first and second air locks 11, 12 are separate from one another and not interconnected.

Purely by way of example, the volume of the first air lock 11 is 5 m$^3$ while the volume of the second air lock 12 is 15 m$^3$.

These vinyl walls also delimit a third air lock 13, referred to as the intervention air lock and having a greater volume than the other two, for example 40 m$^3$.

Of course, an enclosure 10 may have varying volumes depending on the size of the contaminated elements, equipment or installations to be processed.

It is within this intervention air lock 13 that the actual cleanup and/or dismantling operations proper are carried out.

This third air lock 13 comprises an air extraction installation that allows the enclosure to be placed at a reduced pressure in relation to the exterior surroundings in which this enclosure is situated. These exterior surroundings in this instance are the hall of a building housing the enclosure 10.

Advantageously, this air extraction installation that sucks air out of the third volume 13 comprises an extraction device 14 such as a fan, the extraction flow rate of which is adjustable. The installation also comprises an extraction circuit 15 to which the air extraction device 14 is connected, this circuit comprising an installation for filtering the extracted air.

Advantageously, this extraction circuit 15 also comprises a flow meter 16 for accurately measuring the flow rate Q of the extraction device. By way of example, this flow meter 16 comprises an anemometer connected to a processing unit for calculating the extraction flow rate from the extraction speed measured by the anemometer. Alternatively, a Pitot tube would also be suitable for measuring the extraction speed.

One of the walls 17 of this third volume comprises an opening housing a pipe 18. A first end 19 of this pipe opens to the interior of the third air lock 13 of the enclosure while its other end 20 opens to outside this enclosure.

This pipe 18 therefore establishes fluidic communication between the exterior surroundings outside the enclosure and the interior volume of this enclosure. As the enclosure is at a reduced pressure in relation to the exterior surroundings, an incoming flow of air is generated in this pipe 18.

This pipe 18 which, in the embodiment being considered, has a diameter of 100 mm, is preferably made of a rigid plastic such as polyvinyl chloride (PVC), and is assembled in an airtight manner with the vinyl wall 17 of the third air lock. Advantageously, the pipe 18 is lightweight so that it does not weaken the vinyl wall 17 on which it is mounted.

For preference, this pipe 18 is fixed to the wall of the enclosure using fixing tabs 21, the assembly being rendered airtight in this instance by sticking, for example using an adhesive tape.

The end 19 of the pipe that opens to the interior of the enclosure preferably comprises a nonreturn valve 22 that allows air to pass from the exterior surroundings toward the inside of the enclosure 10 but blocks the flow of air in the other direction in order to prevent any risk of contamination outside the enclosure.

A vane anemometer 23 for continuously measuring the speed of the incoming air flow is placed in this pipe 18. Advantageously, the axis about which the vane rotates is kept parallel, or substantially parallel, to the stream line of the incoming air flow passing along the pipe 18.

The assembly is connected to a signal processing unit 24 that processes the signal emitted by the anemometer 23, such as an electronic unit, by a connecting element 25 such as a cable.

The electronic unit allows the measured speed to be read and supports the visible and/or audible alarm 26 that is perceived when the measured speed is below a setpoint speed $V_{reference}$ here taken to be equal to 1 ms$^{-1}$ by way of example.

Thus, in order to obtain the confinement enclosure 10 as described hereinabove for dismantling and/or cleanup work, the following steps will have been carried out:

creating an orifice of calibrated diameter equal to 100 mm, likewise by way of example, in a wall of this enclosure, adjusting the enclosure extraction flow rate so as to obtain a speed at least equal to 1 ms$^{-1}$ measured at the calibrated orifice using the vane anemometer, this speed of 1 ms$^{-1}$ being referred to as $V_{reference}$, measuring the enclosure extraction flow rate for this speed and the pressure drop for the filtration with the pressure drop of the damper compensating for filter plugging (the setpoint for the filtration).

More generally, depending on the dimensions of the orifice and of the enclosure at a reduced pressure, the value $V_{reference}$ of the reference speed of the incoming or outgoing flow of gas used for setting off the alarm will have been determined beforehand.

In order to do so and in one particular aspect of the presently disclosed embodiment, a tracer gas is introduced into the enclosure. This tracer gas is preferably an inert gas such as sulfur hexafluoride (SF$_6$) or helium (He). The chief benefit of these tracer gases lies in their high level of chemical inertia even at high temperatures and in their properties of being detectable continuously and in real time, using mass spectrometry in the case of helium and infrared analysis in the case of SF$_6$.

This tracer gas is swept into the enclosure, for example using a fan attached to and positioned at the center of the third air lock 13.

The presence and concentration of this tracer gas outside the enclosure 10 are detected and measured using one or more analysis apparatuses for various values of the speed of the flow of gas such as air, entering or leaving via the fixed-diameter orifice and under various operating conditions of this enclosure.

The data thus obtained are compared and the smallest of these speed values for which the detected concentration of tracer gas outside the enclosure 10 under the various envisioned operating conditions is below or equal to a threshold value is retained. This threshold value here corresponds to a negligible transfer of the tracer gas to the outside.

Purely by way of illustration, the various operating conditions may be simulated by intervention air lock entrance/exit scenarios such as those described hereafter.

Scenario 1: an operator enters the personnel entrance/exit air lock 11 and then the intervention air lock 13. The personnel leaves the intervention air lock 13 via the personnel entrance/exit air lock 11, waiting time of one minute to simulate the time taken for the operator to undress and then exit to outside the enclosure 10;

Scenario 2: as per scenario 1 but "downgraded" version. The operator does not wait around in the personnel air lock for one minute but exits directly to the outside;

Scenario 3: simulation of materials entering the materials air lock 12 without materials, operator exits, operator enters the personnel entrance/exit air lock 11 and then the intervention air lock 13. Simulation of the recovery of materials from the materials air lock 12, leaving the intervention air lock via the personnel entrance/exit air lock 11, waiting time of one minute to simulate the time taken by the operator to undress, then exit to outside the enclosure 10;

Scenario 4: material entrance/exit in "degraded" version without passing via the personnel entrance/exit air lock 11 and without waiting around for one minute;

Scenario 3': as per scenario 3 but with a material transport device such as a trolley or barrow;

Scenario 4': as per scenario 4 but with a trolley or barrow;

Scenario 5: as per scenario 1 but via the materials air lock;

Scenario 6: no simulation of operator movements but vinyl doors between the personnel entrance/exit air lock and the materials entrance/exit air lock 12 and the outside open and then, in a second phase, with the opening of the vinyl door between the intervention air lock 13 and the materials air lock 12.

It should be noted that scenarios 1 and 3 are the scenarios usually applied in a monitored zone.

The benefit of carrying out scenarios 2, 4, 5 and 6 is that they test other situations which are in theory more penalizing and likely to occur during use.

What is claimed is:

1. A method for monitoring the confinement of an enclosure, said enclosure comprising walls delimiting an interior volume and exterior surroundings outside said enclosure, whereby a differential pressure ($\Delta P$) is continuously maintained between the interior volume of the enclosure and said exterior surroundings, the method comprising with the enclosure comprising an orifice in one of its walls establishing fluidic communication between said interior volume and said exterior surroundings, said orifice has passing through it a flow of gas at a speed (V) at least equal to a reference speed $V_{ref}$ under the effect of said differential pressure ($\Delta P$), according to which method the following steps are carried out:

the speed (V) of said gas flow is measured at predetermined time intervals or continuously and this speed measurement (V) is compared with the reference speed $V_{reference}$, when the speed measurement (V) is lower than the reference speed $V_{reference}$, at least one alarm signal is emitted.

2. The method as claimed in claim 1, wherein said differential pressure ($\Delta P$) between the interior volume of the enclosure and said exterior surroundings is established by at least one ventilation system.

3. The method as claimed in claim 2, wherein, having determined a reference flow rate ($Q_{ref}$) at which said enclosure is ventilated by said at least one ventilation system, the following steps are carried out:

the flow rate (Q) at which said enclosure is ventilated is measured, the ventilation flow rate measurement (Q) thus obtained is compared with the reference flow rate ($Q_{ref}$) to determine whether the ventilation flow rate has dropped, and if appropriate, the ventilation flow rate (Q) is adjusted to generate a gas flow passing through said orifice at a speed at least equal to said reference speed $V_{reference}$.

4. The method as claimed in claim 3, wherein, with the ventilation flow rate (Q) of said enclosure being equal or substantially equal to the reference flow rate ($Q_{ref}$), the leak or leaks in said enclosure is or are located and said leak or leaks is or are plugged.

5. The method as claimed in claim 2, wherein said at least one ventilation system is chosen from the group comprising:
a gas flow extraction system,
a gas flow inlet system, a reversible system capable of switching between a gas flow extraction mode and
a gas flow inlet mode and combinations of these elements.

6. The method as claimed in claim 1, wherein said differential pressure ($\Delta P$) between the interior volume of the enclosure and said exterior surroundings is established by at least one gas flow supply source that has an inlet flow rate (Q).

7. The method as claimed in claim 1, wherein the following steps are performed beforehand in order to determine said value $V_{reference}$ for the reference speed of the gas flow:
- a tracer gas is introduced into said enclosure,
- the presence and concentration of said tracer gas outside said enclosure are detected and measured using one or more pieces of analysis equipment for various values for the speed of the gas flow entering through said fixed-diameter orifice and under various operating conditions of said enclosure,
- the data thus obtained are compared and the smallest of said speed values for which the detected concentration of said tracer gas outside said enclosure under the various envisioned operating conditions is below or equal to a threshold value is retained.

8. The method as claimed in claim 1, wherein said incoming gas flow is air or neutral gas.

9. The method as claimed in claim 1, wherein said reference speed $V_{reference}$ is at least equal to $1\ m \cdot s^{-1}$.

10. The method as claimed in claim 9, wherein said reference speed $V_{reference}$ is strictly equal to $1\ m \cdot s^{-1}$.

11. A device for implementing the method for monitoring the confinement of an enclosure as claimed in claim 1, the device comprises at least:
- a pipe of diameter D intended to be mounted on an orifice of a wall of said enclosure, said pipe comprising a non-return valve which closes off said pipe to prevent the passage of a flow of gas from inside the enclosure toward the exterior surroundings when said enclosure is at a reduced pressure with respect to the exterior surroundings, or from the exterior surroundings toward the interior volume of said enclosure when said enclosure is at a raised pressure with respect to the exterior surroundings, and
- a means of measuring the speed of the gas flow passing along said pipe.

12. The device as claimed in claim 11, wherein said means of measuring speed is an anemometer.

13. The device as claimed in claim 11 wherein it additionally comprises an audible and/or luminous alarm for emitting at least one alarm signal when the speed (V) measured by the speed measuring means is below a threshold speed value.

14. A confinement enclosure comprising at least one interior volume delimited by walls and at least one device for placing this interior volume of said enclosure at a reduced pressure or at a raised pressure in relation to the exterior surroundings in which said enclosure is placed, wherein it comprises a device for implementing the monitoring method as claimed in claim 11, this device being mounted on an orifice of one of said walls of the enclosure delimiting said interior volume.

15. The enclosure as claimed in claim 14, further comprising a flow meter for measuring the extraction flow rate of said device for creating the reduced pressure, or the inlet flow rate of said device for creating a raised pressure, this flow meter comprising an anemometer or a Pitot tube for measuring the extraction or admission speed respectively, said anemometer or said Pitot tube being connected to a processing unit for calculating the extraction or admission flow rate from the extraction or admission speed thus measured, respectively.

* * * * *